J. M. Wood,
Osier Peeler.
N° 29,535.    Patented Aug. 7, 1860.

Witnesses:

Inventor:
John M. Wood

UNITED STATES PATENT OFFICE.

JOHN M. WOOD, OF SENECA, NEW YORK.

WILLOW-PEELER.

Specification of Letters Patent No. 29,535, dated August 7, 1860.

*To all whom it may concern:*

Be it known that I, JOHN M. WOOD, of the town of Seneca, county of Ontario, and State of New York, have invented a new and Improved Willow-Peeler for the Purpose of Stripping the Bark from Willow or other Twigs; and I do hereby declare that the following is a full and exact description thereof, reference being had to the accompanying drawings, and to the letters of reference marked thereon.

The nature of my invention consists in providing a circular revolving disk with a superincumbent cylindrical roller with a graduated screw on its surface and so arranged in reference to the disk that when they are both in motion twigs of willow or other twigs of the same nature will pass between them and be speedily denuded of their bark leaving the twig in proper condition for manufacturing purposes.

To enable others skilled in the art to make and use my invention, I will proceed to describe its construction and operation.

Figure 1:
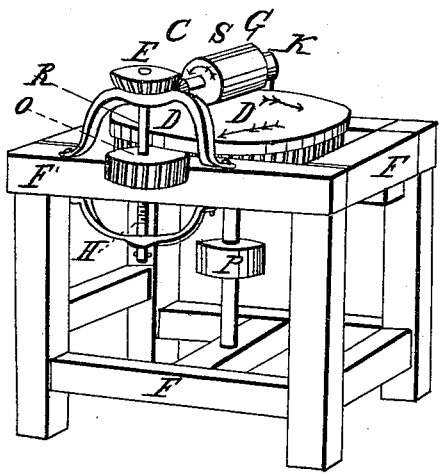

I construct my machine called the willow peeler as follows:

Figure 1, F' F F is a strong frame of suitable size. P a shaft and pulley for driving the machine with a band or other suitable power. This shaft at its upper end is inserted in and forms a part of the disk D, D, which must revolve with it when in motion. The disk D, D, is covered on its entire upper surface with leather, india rubber, gutta percha or other friction surface substance. On the lower edge of the periphery of D are cogs that drive the wheel O, on the shaft R, on the upper end of which shaft is the beveled cog wheel E which drives the screw cylinder S by cogs not seen distinctly in the drawing. The shaft R below both the wheels that it carries penetrates the frame F' or is strapped on its side by suitable journal boxes, and its lower end passes through a stirrup as seen in the drawing. It has a longitudinal upward motion it having no shoulders of its journals. A helical spring H surrounds the shaft R the lower end of the spring being made fast to the shaft and bearing against the upper side of the stirrup the other end of the spring bearing against the frame timber F' a like arrangement of the helical spring and shaft, with the exception of the cogged wheels and gearing, is constructed at and connected with the other end of the shaft of the screw cylinder S, at K by means of which when the machine is at work, and it is necessary, the whole length of the screw cylinder will rise upward from the disk and thus allow twigs of an unusual size to pass and yet be operated upon effectually, for when nothing intervenes between the disk D and the screw cylinder the latter rests upon the disk.

Figure 2:
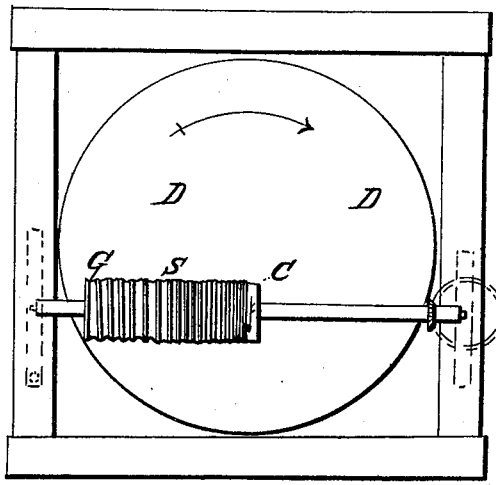

In Fig. 2 is presented a view from above of the disk D, D, and screw cylinder S. This cylinder I will now describe more fully. On this cylinder, made of iron, brass, wood, india rubber or any other suitable material I construct at its right end as seen at C, a short and slightly conical plain surface. This is for the purpose of seizing the small end of the twig before it enters into the screw, next to this conical surface and running from it to the left as seen in the figure I construct a screw on the surface of the cylinder small at first so as to suit the small end of a twig say one eighth of an inch more or less toward G. This screw gradually increases in the size of the thread until it is from one fourth to one half of an inch in its reach and of corresponding depth to suit the large end of the twig subjected to operation. At the end of the cylinder at G I construct a circular groove in which the screw is merged so that a rim at G rounds the end of the screw. This groove receives and throws out of the machine the twig denuded of its bark and thus prevents any choking at the left end of the cylinder which might take place if the screw were suffered to continue its operation to the end of the same.

The operation of the machine is as follows. When the machine is in motion the operator stands at X and X Fig. 1 and Fig. 2 and feeds the machine with twigs by putting the small end of the same at the conical end C of the cylinder. The twig is at once caught and drawn toward the screw and speedily stripped and at the same time that the stripping process is in progress the twig is borne toward G where it is thrown out on the opposite side of the machine entirely denuded, any inequality of the twig is provided for in the arrangement of the helical springs which permit the screw cylinder to adjust itself to any inequality in the twig and still operate upon it as well.

What I claim as my invention and desire to secure by Letters Patent is—

1. The circular friction disk as herein described and for the purpose herein set forth with its suitable covering of leather or other material.

2. The screw cylinder with its cone shaped plain end, its variable screw and its groove.

3. The combination of the disk and screw cylinder with adjustable facilities as herein described and set forth.

JOHN M. WOOD.

Witnesses:
W. F. CUNY,
GEO. B. DUSINBERRE.